UNITED STATES PATENT OFFICE.

ROBERT HOCHSTETTER, OF CINCINNATI, OHIO, ASSIGNOR TO THE AULT & WIBORG COMPANY, OF CINCINNATI, OHIO, A CORPORATION OF OHIO.

INK AND PROCESS FOR PRODUCING SAME.

1,226,884.            Specification of Letters Patent.     Patented May 22, 1917.

No Drawing.      Application filed November 11, 1914. Serial No. 871,464.

*To all whom it may concern:*

Be it known that I, ROBERT HOCHSTETTER, a citizen of the United States and a resident of Cincinnati, in the county of Hamilton and State of Ohio, have invented certain new and useful Improvements in Ink and Processes for Producing Same; and I do hereby declare that the following is a full, clear, and exact description thereof.

This invention relates to a novel ink and process for producing same and consists of the matters hereinafter described and more particularly pointed out in the appended claims.

The improved ink is designed particularly for use on a mimeograph or like machine, and especially for use on an oscillating or rotary mimeograph and is of the general type of the mimeograph inks described in Letters Patent of the United States Nos. 928,915 and 928,450 heretofore granted to me on the 20th day of July, 1909. A mimeograph ink of the kind described contains Turkey red oil and glycerin. The glycerin being hygroscopic will absorb moisture, so that when exposed in damp weather or in places where a moist temperature maintains, the ink becomes thin in body and tinctorially weak. As a result the print made will be broad and weak in character and the letters will lack the degree of sharpness desirable in order to make the work on the mimeograph approximate the appearance of good work on a typewriting machine, which is the end aimed at in mimeograph work. In addition, in the case of the prior inks referred to, if an ink pad were allowed to remain on the mimeograph machine, the moisture absorbed by the ink would attack and corrode the cylinder with the result that in a comparatively short time the holes in the cylinder would become entirely plugged up, so as to prevent the pad from feeding the ink continuously to the stencil.

By reducing the proportion of glycerin in the ink to a minimum and increasing the proportion of Turkey red oil to a maximum, the hygroscopic quality of the ink is reduced, but if too much Turkey red oil is used the ink is apt to gum and clog the stencil. Gum tragacanth has been added in a small proportion to the ink to act as a sponge or skeleton to hold the pigment in the varnish, but its use alone has not been entirely successful.

My improved ink overcomes all these difficulties and is made as follows:

I take an ink of the kind described in the patents hereinbefore referred to, and which consists generally of a pigment ground in a mixture of glycerin and Turkey red oil or other sulfonated oil. In the case of organic pigments, the pigment is constructed on a base which will not enter into a chemical reaction with glycerin, such, for example, as barium sulfate. To this ink, which is preferably made with a maximum of the Turkey red oil or other sulfonated oil and a minimum of glycerin, I add rosin varnish, preferably to the amount of from five to ten per cent. of the weight of the ink, the said percentage depending upon the ink to which it is added. This varnish will not mix with the ink readily and must be treated in such manner as to thoroughly mix it with the ink. This may be done to the best advantage by grinding the varnish into the ink. Thus the ink and varnish are first mixed as thoroughly as may be in a pony mixer and the mixture is then run through a three-roller mill. The result of this treatment is apparently the formation of an emulsion which is of a permanent character and on standing there is no tendency of the glycerin and the Turkey red oil to separate from the rosin varnish.

An ink made in this way may stand for almost an indefinite period, at least for about six months, without thickening and it also may stand on the pad for about the same period without drying, so that at the end of said period the pad will do good work.

The rosin varnish helps to prevent the pigment from settling and in addition seems to shorten the time of setting of the ink when printed and prevents the spreading of the ink.

As a specific example of one way to make my improved ink, I proceed as follows:

I take 176# of purple pigment and grind it in 176# of glycerin. The pigment must, of course, be of a kind that will not enter into a chemical reaction with the glycerin. To this I add 528# of Turkey red oil and 176# of glycerin. Preferably before adding the glycerin I dissolve with it 1% by weight of gum tragacanth. The whole is then thoroughly mixed.

To the ink as thus made I add from 53 to 105 pounds of rosin varnish depending upon the mimeograph ink to which it is added. This is first mixed with the ink and then the mixture is run through a three-roller mill in order to thoroughly incorporate the varnish with the other ingredients. This produces the ink.

In the case of purple and blue mimeograph inks, there is a tendency for the pigment to dissolve to a slight extent in the vehicle and this tendency of going into solution is increased as the ink is allowed to stand. In the case of such inks made as above described with the addition of rosin varnish, this tendency is checked in a great measure and such purple and blue mimeograph inks produce sharper prints and the work seems to have a cleaner appearance.

While I prefer the use of rosin varnish in the manufacture of my ink, the invention is not limited thereto, as a like result is produced with the use of other varnishes, for example, any gum varnish, that is to say, a varnish composed of oil, and of a gum such as kauri, Manila or similar gums.

I claim as my invention:

1. An ink for mimeographs and the like, comprising, a pigment, a sulfonated oil and glycerin and a gum varnish, substantially in the proportions described.

2. An ink for mimeographs and the like comprising a pigment, a sulfonated oil and glycerin, to which is added a gum varnish, the varnish being thoroughly mixed with and ground into the other ingredients of the ink, the ingredients being substantially in the proportions described.

3. An ink for mimeographs and the like consisting of an ink of the kind described comprising a pigment, a sulfonated oil and glycerin, substantially in the proportions described, to which has been added about 5% by weight of a gum varnish, the gum varnish being thoroughly ground into and mixed with the ink.

4. An ink for mimeographs and the like consisting of an emulsion of gum varnish and a mimeograph ink of the kind described containing a pigment, a sulfonated oil and glycerin, the ingredients of the ink being substantially in the proportions described.

5. The process of producing an ink for mimeographs and the like which consists in grinding a pigment, a sulfonated oil and glycerin, then mixing therewith a gum varnish, all substantially in the proportions described, then grinding the gum varnish thoroughly into the ingredients of the ink to form an emulsion.

In testimony that I claim the foregoing as my invention I affix my signature in the presence of two witnesses, this 29th day of October, A. D. 1914.

ROBERT HOCHSTETTER.

Witnesses:
 CHARLES AULT MANSELL,
 BERTHA A. ZUISER.